US007676213B2

(12) United States Patent
Taylor et al.

(10) Patent No.: US 7,676,213 B2
(45) Date of Patent: Mar. 9, 2010

(54) VGS REPLICATION APPARATUS, METHOD, AND SYSTEM

(76) Inventors: Stewart S. Taylor, 16927 NW. Hazelgrove Ct., Beaverton, OR (US) 97006; Jing-Hong C. Zhan, 1, Alley 11, Lane 69, Kung Hua 2nd St., HsinChu, 300 (TW)

( * ) Notice: Subject to any disclaimer, the term of this patent is extended or adjusted under 35 U.S.C. 154(b) by 629 days.

(21) Appl. No.: 11/644,138

(22) Filed: Dec. 22, 2006

(65) Prior Publication Data

US 2008/0150624 A1 Jun. 26, 2008

(51) Int. Cl.
*H04B 1/28* (2006.01)
*G05F 1/10* (2006.01)

(52) U.S. Cl. .................... 455/333; 455/343.1; 455/323; 327/540; 327/541; 327/543

(58) Field of Classification Search ................. 455/280, 455/289, 323, 333; 327/530, 540–543; 323/311, 323/313
See application file for complete search history.

(56) References Cited

U.S. PATENT DOCUMENTS 4,686,387 A * 8/1987 Rumelhard ................. 327/541
4,736,153 A * 4/1988 Kogan ........................ 323/313
4,970,471 A * 11/1990 Taylor ........................ 330/253
5,004,971 A * 4/1991 Fitzpatrick et al. .......... 323/312
5,065,043 A * 11/1991 Bartling et al. ............. 327/543
5,333,093 A * 7/1994 Krautschneider et al. ...... 361/56
6,049,445 A * 4/2000 Gauthier et al. ............... 361/56
6,194,943 B1 * 2/2001 Yoshizaki et al. ........... 327/318
6,242,963 B1 * 6/2001 Su et al. ..................... 327/359
6,469,568 B2 * 10/2002 Toyoyama et al. .......... 327/534
6,737,909 B2 * 5/2004 Jaussi et al. ................. 327/541
7,161,412 B1 * 1/2007 Manganaro ................. 327/543
7,202,694 B2 * 4/2007 Eberlein ...................... 324/769
7,202,744 B1 * 4/2007 Manganaro ................. 330/296
7,256,621 B2 * 8/2007 Lih et al. .................... 326/121
7,433,656 B2 * 10/2008 Kappes et al. ........... 455/114.2
7,551,017 B2 * 6/2009 Felder ........................ 327/333
2002/0030533 A1 * 3/2002 De et al. ..................... 327/534
2002/0075724 A1 * 6/2002 Pekny ................... 365/185.02

* cited by examiner

*Primary Examiner*—Duc M Nguyen
(74) *Attorney, Agent, or Firm*—Dana B. Lemoine; Lemoine Patent Services, PLLC

(57) ABSTRACT

A gate-to-source voltage (Vgs) replication circuit includes a diode-connected NMOS transistor coupled to a current source to draw a drain-to-source current therethrough. The generated Vgs is imposed across a source-to-gate junction of a PMOS transistor. A second PMOS transistor is coupled in series with the first PMOS transistor such that the source-to-gate voltage (Vsg) of the second PMOS transistor replicates the Vgs of the NMOS circuit. The second PMOS transistor is coupled as a source follower to bias other NMOS transistors.

18 Claims, 4 Drawing Sheets

VGS REPLICATION APPARATUS, METHOD, AND SYSTEM

FIELD

The present invention relates generally to transistor circuits, and more specifically to circuits useful for biasing transistor circuits.

BACKGROUND

In some applications, transistors may be "biased" to operate in a particular fashion. For example, a field effect transistor (FET) may be biased by having a "bias voltage" applied between two device terminals of the FET. Prior art bias circuits may apply a constant gate-to-source voltage (Vgs) between gate and source terminals of a transistor.

Transistor characteristics may vary due to manufacturing variations and/or operating conditions. For example, a transistor's threshold voltage (Vth) may change due to temperature or power supply voltage variations.

DESCRIPTION OF EMBODIMENTS

Figure 1:
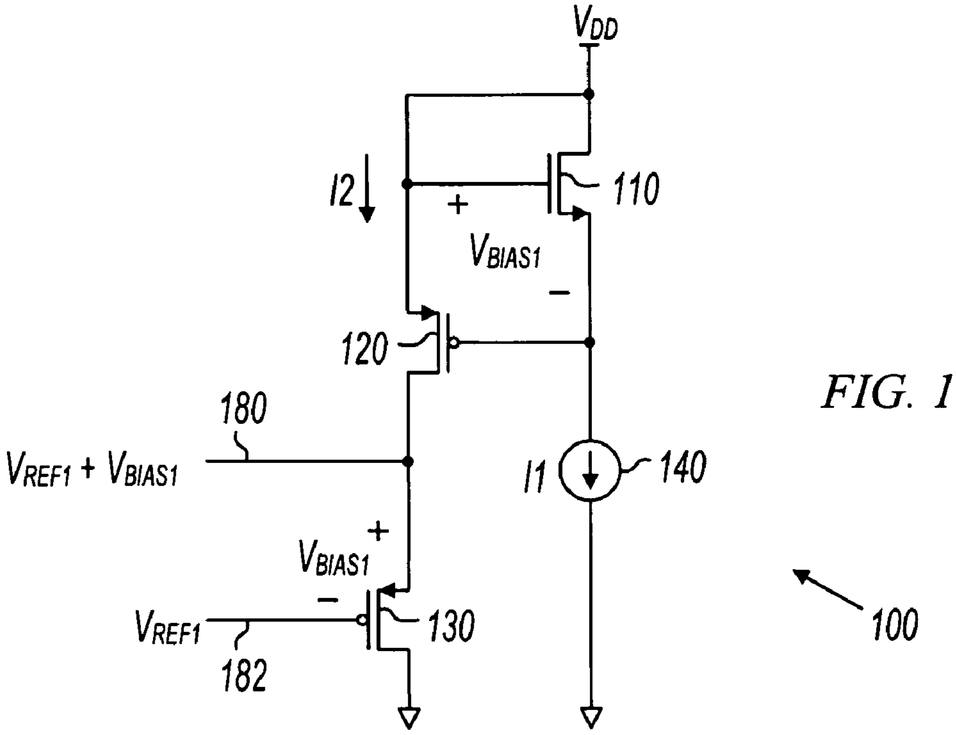
FIGS. 1 and 2 show diagrams of Vgs replication circuits.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a diagram of a Vgs replication circuit. Circuit 100 includes transistors 110, 120, and 130, and current source 140. As shown in FIG. 1, transistors 110, 120, and 130 are insulated gate transistor such as an n-channel metal oxide semiconductor field effect transistor (NMOSFET) and p-channel MOSFET (PMOSFET). NMOSFET and PMOSFET transistors may be referred to as NMOS and PMOS, respectively. Transistor 110 is shown as an NMOS transistor, and the remaining transistors are shown as PMOS. Transistor 110 is coupled drain-to-source between a power supply node (shown as $V_{DD}$) and current source 140. The power supply node may have any voltage value. For example, in some embodiments, the power supply node may have a voltage of between one and three volts. As used herein, the term "power supply" and "power supply node" may refer to one physical node, and do not necessarily refer to two circuit nodes having a voltage potential therebetween.

Transistor 110 also has a gate node coupled to the drain node. This configuration is referred to herein as a "diode-connected" transistor. When a current is drawn through a diode-connected transistor, a gate-to-source voltage will result. In some embodiments, transistor 110 is not diode-connected. For example, the gate of transistor 110 may be coupled to an auxiliary bias circuit, and the drain may be suitably connected for transistor 110 to operate in the saturation region.

In operation, current source 140 provides current I1 drain-to-source through transistor 110. In response to current I1 traveling from drain-to-source through transistor 110, a voltage ($V_{BIAS1}$) appears as the gate-to-source voltage (Vgs) between the gate node and source node of transistor 110. $V_{BIAS1}$ is related to the threshold voltage of transistor 110 and the amplitude of current I1 provided by current source 140. For example, for a nominal current I1, $V_{BIAS1}$ may be close to the threshold voltage of transistor 110, or somewhat different according to the application.

Transistor 120 is coupled to transistor 110 such that $V_{BIAS1}$ is imposed from the source node to the gate node of transistor 120. As shown in FIG. 1, transistor 120 is of a type complementary to transistor 110. For example, transistor 120 may be a p-channel device whereas transistor 110 may be an n-channel device. Transistor 120 conducts current I2, the amplitude of which is related to the source-to-gate voltage (Vsg) $V_{BIAS1}$. Transistor 130 is coupled in series, or "stacked," with transistor 120 such that substantially all of current I2 travels source-to-drain through both transistors 120 and 130. In some embodiments, transistors 120 and 130 are manufactured on the same integrated circuit such they have similar device characteristics, and are subjected to the same voltage and temperature variations. In these embodiments, transistors 120 and 130 will have substantially matched Vsg for a given source-to-drain current I2. In this example, the Vsg for both transistors 120 and 130 is $V_{BIAS1}$.

Circuit 100 has nodes 182 and 180 having a voltage differential of $V_{BIAS1}$. For example, if a voltage is imposed on node 182 from an external source (shown as $V_{REF1}$) then the voltage at 180 will be $V_{REF1}+V_{BIAS1}$. The voltage between nodes 180 and 182 is substantially equal to a threshold voltage of an NMOS transistor such as transistor 110 even though it appears across the source and gate terminals of a complementary source follower transistor such as transistor 130. This source follower bias circuit may be utilized as a low impedance bias circuit to bias other NMOS transistors. As shown in FIG. 1, the Vgs of transistor 110 is replicated as the Vsg of transistor 130.

In some embodiments, transistors 120 and 130 have different sizes such that the source-to-gate voltage across transistor 130 is different than transistor 120. For example, gate area, length, or width of transistor 130 may be a multiple or sub-multiple of the corresponding measure of transistor 120. In this manner, any bias voltage may be created across the source-to-gate junction of transistor 130, where that bias voltage is related to, and controlled by, the gate-to-source voltage of transistor 110.

Figure 2:
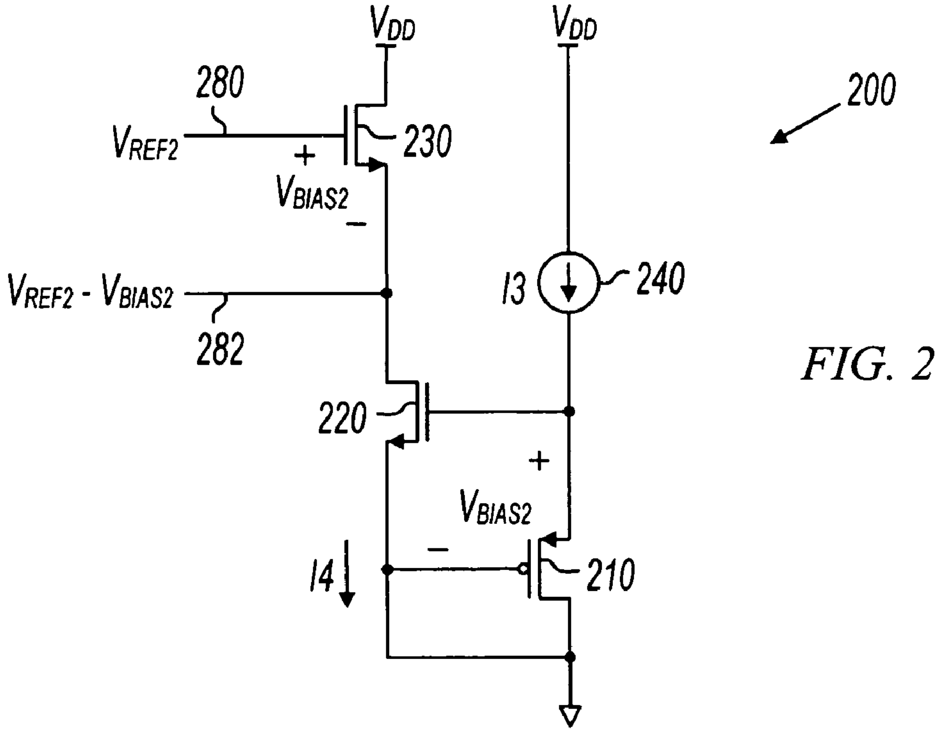

FIG. 2 shows a diagram of a Vgs (or Vsg) replication circuit. Circuit 200 shows transistors 210, 220, 230, and current source 240. As shown in FIG. 2, transistor 210 is a p-channel transistor and transistors 220 and 230 are n-channel transistors. Current source 240 produces current I3 which conducts source-to-drain through transistor 210. As a result of I3 conducting through transistor 210, a source-to-gate voltage $V_{BIAS2}$ appears. $V_{BIAS2}$ is imposed across the gate-to-source of transistor 220, which then produces current I4. Current I4 conducts drain-to-source through both transistors 220 and 230, and transistor 230 has a gate-to-source voltage of $V_{BIAS2}$ as a result. When a reference voltage $V_{REF2}$ is imposed on node 280, then the voltage appearing on node 282 is $V_{REF2}-V_{BIAS2}$.

The circuit of FIG. 2 is a complementary circuit to that of FIG. 1. For example, the source follower transistor 230 is an n-channel transistor in circuit 200 whereas the source follower transistor 130 is a p-channel device in circuit 100. The voltage between nodes 280 and 282 is substantially equal to a threshold voltage of a PMOS transistor such as transistor 210 even though it appears across the gate and source terminals of a complementary source follower transistor such as transistor 130. Accordingly, the Vsg of transistor 210 is replicated as the Vgs of transistor 230.

Figure 3:
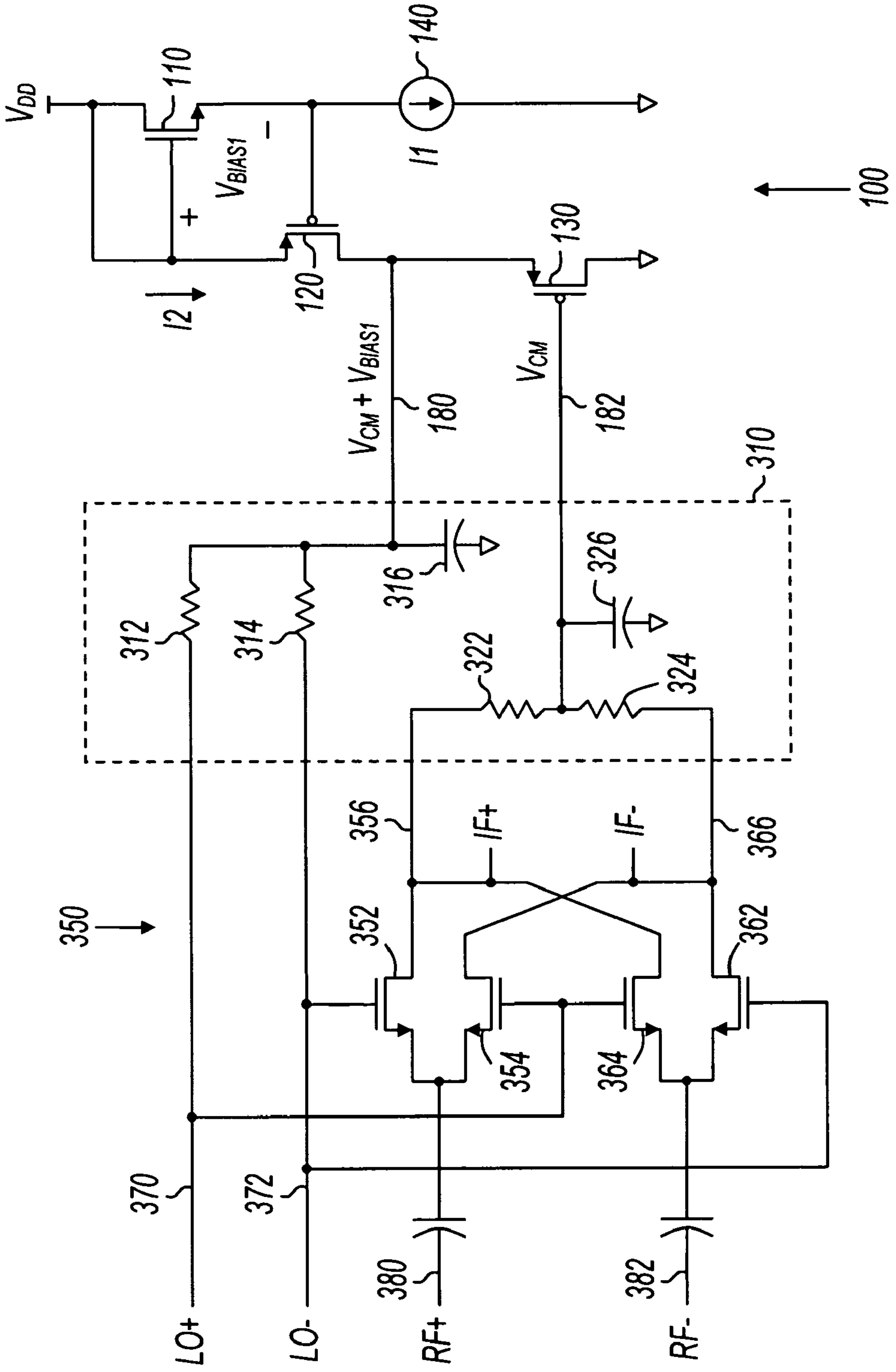
FIG. 3 shows a diagram of a biased passive mixer circuit.

FIG. 3 shows a diagram of a biased passive mixer circuit. Passive mixer circuit 350 includes transistors that are biased using Vgs replication circuit 100. FIG. 3 also shows passive auxiliary biasing circuitry 310. Passive mixer circuit 350 includes transistors 352, 354, 362, and 364. A differential radio frequency (RF) signal is driven on nodes 380 and 382, which are coupled to source nodes of transistors 352, 354, 362, and 364. A differential local oscillator (LO) signal is driven on nodes 370 and 372, which are coupled to gate nodes of the transistors. Passive mixer 350 produces a differential intermediate frequency (IF) output on nodes 356 and 366. Nodes 356 and 366 may be coupled to a transimpedance amplifier with low input impedance.

In operation, transistors 352, 354, 362, and 364 are biased such that the gate-to-source of the n-channel transistors have a DC bias component substantially equal to $V_{BIAS1}$, which is determined by transistor 110.

Passive auxiliary bias circuit 310 includes resistors 312, 314, 322, and 324, and capacitors 316 and 326. Resistors 322 and 324 and capacitor 326 form a low pass filter to provide the output common mode voltage $V_{CM}$ on node 182, which is coupled to the gate node of transistor 130. As described above with reference to FIG. 1, node 180 has a voltage substantially equal to $V_{CM}$ plus $V_{BIAS1}$. Resistors 312 and 314, and capacitor 316 form a low pass filter which allows the voltage on node 180 to be the DC component on local oscillator input nodes 370 and 372. Accordingly, the source-to-gate voltage across transistor 130 ($V_{BIAS1}$) is substantially equal to the DC bias voltage provided between the gate and drain nodes of transistors 352, 354, 362, and 364.

The LO and RF signals for the passive mixer are AC coupled. Therefore the drain and source voltages of transistors 352, 354, 362, and 364 are the DC voltages of IF+ and IF−, which are set by the next stage, which in some embodiments may be a transimpedance amplifier or a variable gain amplifier. Resistors 322 and 324, and capacitor 326 form a low pass filter and produce the common mode voltage $V_{CM}$ of IF+ and IF−. This sets the gate voltage of transistor 130. The source voltage of transistor 130 is low pass filtered by capacitor 316, and resistors 312 and 314 set the gate voltage of transistors 352, 354, 362, and 364. Therefore Vgs for transistors 352, 354, 362, and 364 is set by Vgs of transistor 130. However, because transistor 130 is a PMOS transistor and transistors 352, 354, 362, and 364 are NMOS, their threshold voltage will not track over process corners and temperature. This is alleviated by the addition of transistors 120, 110, and I1. In the example of FIG. 3, transistors 120 and 130 are PMOS of the same gate width-to-length ratio (W/L). Since the same amount of current pass through these two transistors, to the first order their Vgs have to be the same. This same Vgs also appears across the gate and source of transistor 110 due to the configuration shown in FIGS. 1 and 3. This sets the Vgs of transistors 352, 354, 362, and 364 to be identical to the Vgs of transistor 110. Now that transistor 110 and transistors 352, 354, 362, and 364 are all NMOS, they will track across process and temperature corners. The Vgs of transistor 110 can be easily controlled by the current I1 because it is diode connected. This provides additional flexibility to fine-tune and optimize the mixer performance.

When transistors 352, 354, 362, and 364 are on, they have a very low on resistance, and a voltage at the drain and source nodes are substantially equal. For this reason, providing the bias voltage between the gate and drain nodes is substantially equivalent to providing a bias voltage between the gate and source nodes. Further, depending on voltage values, what is referred to herein as the drain may actually function as a source and vice versa.

As shown in FIG. 3, an n-channel transistor may be biased using a p-channel source follower that has a source-to-gate voltage dictated by a gate-to-source voltage of an n-channel transistor.

Mixer 350 has low flicker noise since almost no low DC current flows through the mixer transistors 352, 354, 362, and 364. The bias voltage of the gates of transistors 352, 354, 362, and 364 affects the mixer performance in the following way. When Vgs is greater than the threshold voltage Vth, transistors pairs 352, 362 and 354, 364 will be simultaneously turned on in each LO cycle. This increases the gain of the mixer and also increases the output thermal noise. However if the Vgs is biased too low, for a fixed LO swing $V_{LO}$, the overdrive voltage $V_{LO}$−Vth is reduced and linearity will be degraded. Biasing at a different Vgs may fold 1/f noise from harmonics of the LO. The circuits shown in FIG. 3 operate to bias transistors 352, 354, 362, and 364 close to the threshold voltage. In addition, the various embodiments represented by FIG. 3 allow this voltage to be easily controlled for adjustment.

Figure 4:
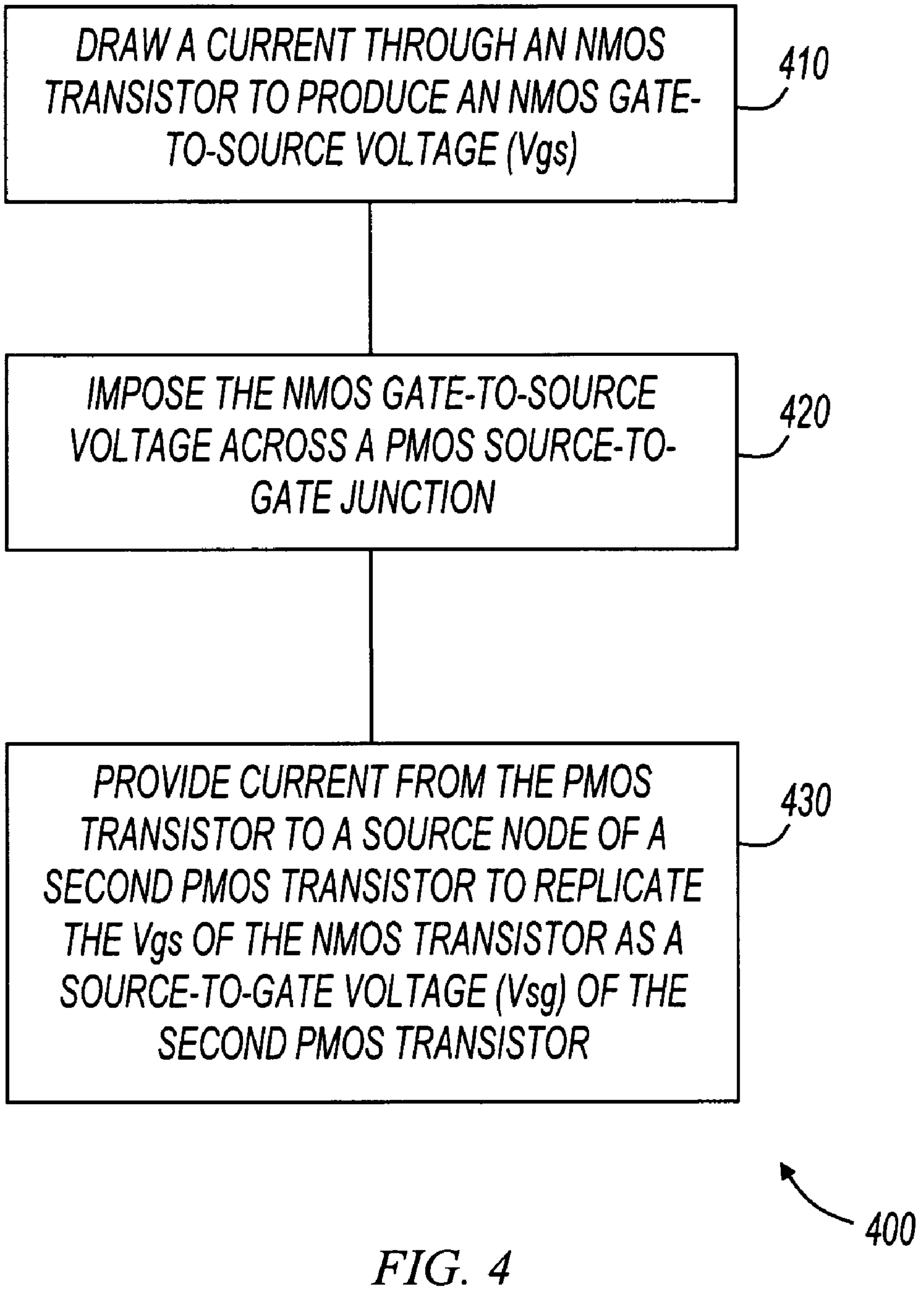
FIG. 4 shows a flowchart in accordance with various embodiments of the present invention.

FIG. 4 shows a flowchart in accordance with various embodiments of the present invention. In some embodiments, method 400, or portions thereof, is performed by a bias circuit, embodiments of which are shown in previous figures. In other embodiments, method 400 is performed by a biased mixer, an integrated circuit, or an electronic system. Method 400 is not limited by the particular type of apparatus performing the method. The various actions in method 400 may be performed in the order presented, or may be performed in a different order. Further, in some embodiments, some actions listed in FIG. 4 are omitted from method 400.

Method 400 begins at 410 when a current is drawn drain-to-source through an NMOS transistor to produce an NMOS gate-to-source voltage (Vgs). For example, referring now to FIG. 1, current source 140 draws a current I1 through NMOS transistor 110 and produces gate-to-source voltage $V_{BIAS1}$.

At 420, the NMOS gate-to-source voltage is imposed across a PMOS source-to-gate junction. As shown in FIG. 1, $V_{BIAS1}$ is imposed across the source-to-gate junction of PMOS transistor 120. Current I2 flows source-to-drain in transistor 120 in response to $V_{BIAS1}$ being applied source-to-gate.

At 430, current from the PMOS transistor is provided to a source node of a second PMOS transistor to replicate the Vgs of the MOS transistor as a source-to-gate voltage of the second PMOS transistor. Referring again to FIG. 1, current I2 is provided from PMOS transistor 120 to the source node of PMOS transistor 130. Because both PMOS transistors have the same source-to-drain current, both PMOS transistors also have equal Vsg. The Vsg of both PMOS transistors is $V_{BIAS1}$.

Using method embodiments of the present invention, a bias voltage from one type of transistor may be replicated across a gate to source junction of a complementary transistor.

Figure 5:
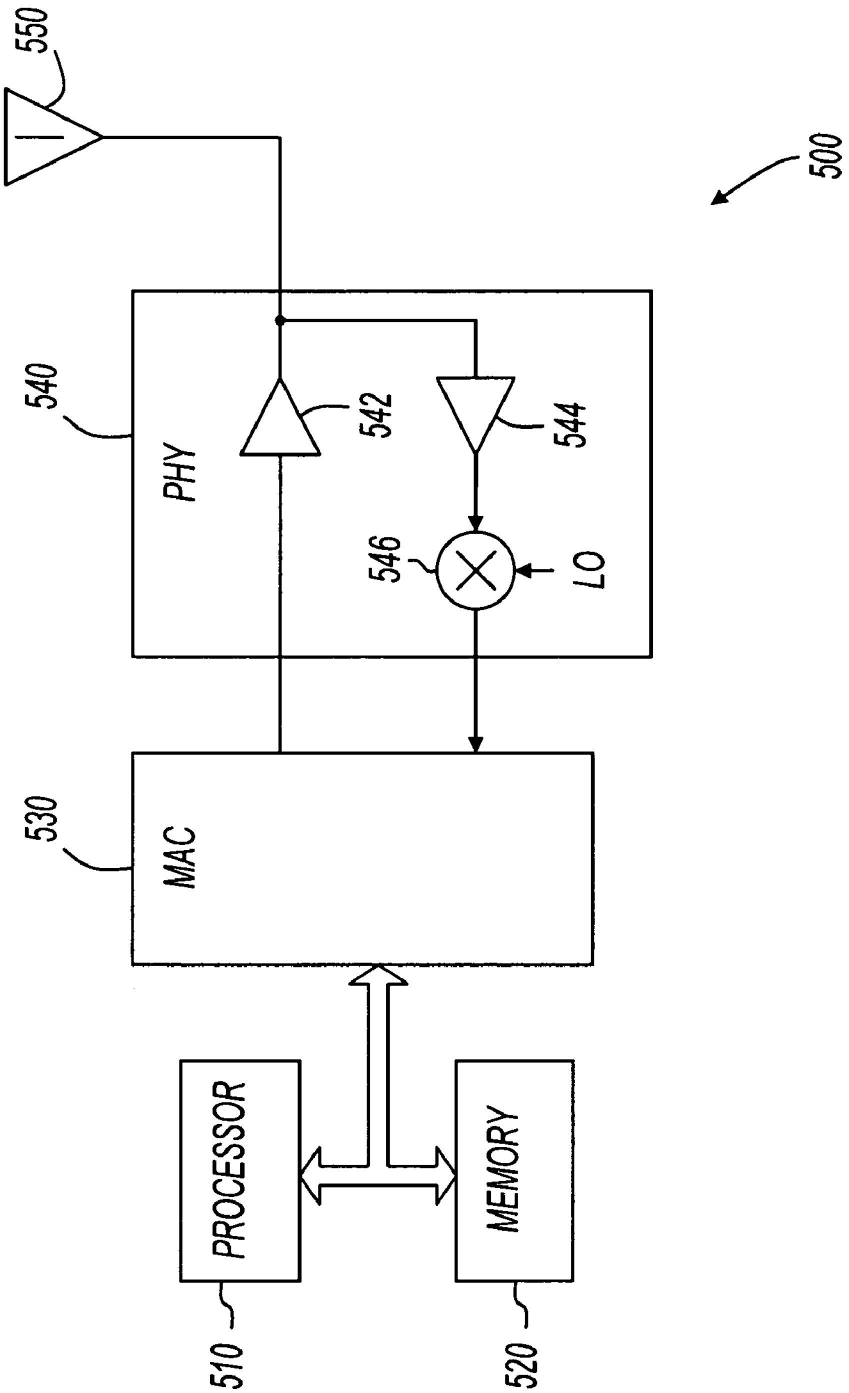
FIG. 5 shows a diagram of an electronic system in accordance with various embodiments of the present invention.

FIG. 5 shows a system diagram in accordance with various embodiments of the present invention. Electronic system 500 includes antenna 550, physical layer (PHY) 540, media access control (MAC) layer 530, processor 510, and memory 520. In operation, system 500 sends and receives signals using antenna 550, and the signals are processed by the various elements shown in FIG. 5.

Antenna 550 may include one or more antennas. For example, antenna 550 may include a single directional antenna or an omni-directional antenna. As used herein, the term omni-directional antenna refers to any antenna having a substantially uniform pattern in at least one plane. For example, in some embodiments, antenna 550 may include a single omni-directional antenna such as a dipole antenna, or a quarter wave antenna. Also for example, in some embodiments, antenna 550 may include a single directional antenna such as a parabolic dish antenna or a Yagi antenna. In still further embodiments, antenna 550 may include multiple physical antennas. For example, in some embodiments, multiple antennas are utilized for multiple-input-multiple-output (MIMO) processing or spatial-division multiple access (SDMA) processing.

Physical layer (PHY) 540 is coupled to antenna 550 to interact with other wireless devices. PHY 540 may include circuitry to support the transmission and reception of radio frequency (RF) signals. For example, as shown in FIG. 5, PHSY 540 includes power amplifier (PA) 542, low noise amplifier (LNA) 544, and mixer 546. Mixer 546 may implement a passive mixer biased with a Vgs replication circuit as described above. In some embodiments, PHY 540 includes additional functional blocks to perform filtering, gain, frequency conversion or the like.

PHY 540 may be adapted to transmit/receive and modulate/demodulate signals of various formats and at various frequencies. For example, PHY 540 may be adapted to receive time domain multiple access (TDMA) signals, code domain multiple access (CDMA) signals, global system for mobile communications (GSM) signals, orthogonal frequency division multiplexing (OFDM) signals, multiple-input-multiple-output (MIMO) signals, spatial-division multiple access (SDMA) signals, or any other type of communications signals. The various embodiments of the present invention are not limited in this regard.

Example systems represented by FIG. 5 include cellular phones, personal digital assistants, wireless local area network interfaces, and the like. Many other systems uses for bias circuits and biased transistor circuits exist. For example, mixer 546 may be used in a desktop computer, a network bridge or router, or any other system without an antenna.

Media access control (MAC) layer 530 may be any suitable media access control layer implementation. For example, MAC 530 may be implemented in software, or hardware or any combination thereof. In some embodiments, a portion of MAC 530 may be implemented in hardware, and a portion may be implemented in software that is executed by processor 510. Further, MAC 530 may include a processor separate from processor 510.

Processor 510 may be any type of processor capable of communicating with memory 520, MAC 530, and other functional blocks (not shown). For example, processor 510 may be a microprocessor, digital signal processor (DSP), microcontroller, or the like.

Memory 520 represents an article that includes a machine readable medium. For example, memory 520 represents a random access memory (RAM), dynamic random access memory (DRAM), static random access memory (SRAM), read only memory (ROM), flash memory, or any other type of article that includes a medium readable by processor 510. Memory 520 may store instructions for performing software driven tasks. Memory 520 may also store data associated with the operation of system 500.

Although the various elements of system 500 are shown separate in FIG. 5, embodiments exist that combine the circuitry of processor 510, memory 520, MAC 530, and all or a portion of PHY 540 in a single integrated circuit. For example, MAC 530 and PA 544 may be combined together on an integrated circuit die. In some embodiments, the various elements of system 500 may be separately packaged and mounted on a common circuit board. In other embodiments, the various elements are separate integrated circuit dice packaged together, such as in a multi-chip module, and in still further embodiments, various elements are on the same integrated circuit die.

Vgs replications circuits, bias circuits, biased transistor circuits, and other embodiments of the present invention can be implemented in many ways. In some embodiments, they are implemented in integrated circuits as part of electronic systems. In some embodiments, design descriptions of the various embodiments of the present invention are included in libraries that enable designers to include them in custom or semi-custom designs. For example, any of the disclosed embodiments can be implemented in a synthesizable hardware design language, such as VHDL or Verilog, and distributed to designers for inclusion in standard cell designs, gate arrays, or the like. Likewise, any embodiment of the present invention can also be represented as a hard macro targeted to a specific manufacturing process. For example, portions of Vgs replication circuit 100 (FIG. 1) may be represented as polygons assigned to layers of an integrated circuit.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A circuit comprising:

a first NMOS transistor having a gate node and drain node coupled to a power supply node;

a current source coupled to a source node of the first NMOS transistor to provide a drain-to-source current (Ids) through the first NMOS transistor, and to produce a first gate-to-source voltage (Vgs) between the gate node and source node of the first NMOS transistor; and a plurality of stacked PMOS transistors coupled such that a source-to-gate voltage (Vsg) of at least one of the plurality of stacked PMOS transistors matches the Vgs of the first NMOS transistor.

2. The circuit of claim 1 wherein the plurality of stacked PMOS transistors comprises:

a first PMOS transistor having a source node coupled to the gate node of the first NMOS transistor, and a gate node coupled to the source node of the first NMOS transistor; and a second PMOS transistor having a source node coupled to the drain node of the first PMOS transistor, and a source node coupled to a reference node.

3. The circuit of claim 2 further comprising a second NMOS transistor biased by a Vsg of the second PMOS transistor.

4. The circuit of claim 3 further comprising a low pass filter coupled between the second NMOS transistor and the second PMOS transistor.

5. The circuit of claim 2 further comprising a mixer circuit having a plurality of NMOS transistors biased by a Vsg of the second PMOS transistor.

6. The circuit of claim 5 further comprising at least one low pass filter coupled between the plurality of NMOS transistors and the second PMOS transistor.

7. The circuit of claim 2 further comprising a circuit to be biased that produces a reference voltage on a gate node of the second PMOS transistor, and receives a bias voltage from the source node of the second PMOS transistor.

8. The circuit of claim 7 wherein the circuit to be biased comprises a mixer circuit.

9. The circuit of claim 8 further comprising a low pass filter coupled between the mixer circuit and the gate node of the second PMOS transistor.

10. The circuit of claim 2 wherein the first and second PMOS transistors are substantially matched to have similar Vsg.

11. The circuit of claim 2 wherein the first and second PMOS transistors have dissimilar width-to-length ratios (W/L) to produce dissimilar Vsg.

12. A method comprising:

replicating a gate-to-source voltage of an NMOS transistor across a source-to-gate junction of a PMOS transistor to provide a bias voltage for a second NMOS transistor, wherein replicating comprises drawing a current through the NMOS transistor, and imposing the Vgs of the NMOS transistor across the source-to-gate junction of the PMOS transistor; and providing current from the PMOS transistor to a source node of a second PMOS transistor to replicate the Vgs of the NMOS transistor as a Vsg of the second PMOS transistor.

13. The method of 12 wherein the PMOS transistor and second PMOS transistor have dissimilar width-to-length ratios (W/L), and replicating the Vgs of the NMOS transistor comprises creating a Vsg that is a multiple of the Vgs of the NMOS transistor.

14. A system comprising:

an antenna; and a mixer circuit coupled to receive a signal from the antenna, the mixer circuit having a first NMOS transistor having a gate node and drain node coupled to a power supply node, a current source coupled to a source node of the first NMOS transistor to provide a drain-to-source current (Ids) through the first NMOS transistor, and to produce a first gate-to-source voltage (Vgs) between the gate node and source node of the first NMOS transistor, and a plurality of stacked PMOS transistors coupled such that a source-to-gate voltage (Vsg) of at least one of the plurality of stacked PMOS transistors matches the Vgs of the first NMOS transistor.

15. The system of claim 14 wherein the plurality of stacked PMOS transistors comprises:

a first PMOS transistor having a source node coupled to the gate node of the first NMOS transistor, and a gate node coupled to the source node of the first NMOS transistor; and a second PMOS transistor having a source node coupled to the drain node of the first PMOS transistor, and a source node coupled to a reference node.

16. The system of claim 15 wherein the mixer circuit further comprises a plurality of NMOS transistors biased by a Vsg of the second PMOS transistor.

17. The system of claim 16 further comprising at least one low pass filter coupled between the plurality of NMOS transistors and the second PMOS transistor.

18. The system of claim 15 wherein the first and second PMOS transistors are substantially matched to have similar Vsg.

* * * * *